(12) United States Patent
Carolan et al.

(10) Patent No.: US 7,703,472 B2
(45) Date of Patent: Apr. 27, 2010

(54) MODULE ISOLATION DEVICES

(75) Inventors: Michael Francis Carolan, Allentown, PA (US); John Albert Cooke, Allentown, PA (US); Michael David Buzinski, Slatington, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1175 days.

(21) Appl. No.: 11/296,633

(22) Filed: Dec. 7, 2005

(65) Prior Publication Data

US 2007/0125425 A1  Jun. 7, 2007

(51) Int. Cl.
*F16K 17/40* (2006.01)
*B01D 53/047* (2006.01)

(52) U.S. Cl. .............. 137/71; 55/523; 96/7; 96/11

(58) Field of Classification Search .............. 137/71, 137/461, 901; 220/89.2; 95/45, 54; 96/7, 96/11; 55/523
See application file for complete search history.

(56) References Cited

U.S. PATENT DOCUMENTS

| | | | | |
|---|---|---|---|---|
| 1,311,774 | A | * | 7/1919 | Ritter .......................... 137/71 |
| 1,968,086 | A | * | 7/1934 | Mapes ......................... 169/11 |
| 2,163,401 | A | * | 6/1939 | Loudenbeck .............. 220/89.2 |
| 2,226,732 | A | * | 12/1940 | McBride ....................... 137/71 |
| 2,765,801 | A | * | 10/1956 | Selim .......................... 137/71 |
| 4,240,458 | A | | 12/1980 | Huff |
| 4,566,476 | A | * | 1/1986 | Fallon et al. ................. 137/71 |
| 5,067,511 | A | | 11/1991 | Taylor |
| 5,681,373 | A | | 10/1997 | Taylor et al. |
| 5,810,057 | A | | 9/1998 | Westman |
| 6,131,599 | A | | 10/2000 | DeGood |
| 6,264,726 | B1 | * | 7/2001 | Phelps et al. ................... 95/45 |
| 6,484,742 | B1 | | 11/2002 | Brazier et al. |
| 2004/0186018 | A1 | | 9/2004 | Carolan et al. |

FOREIGN PATENT DOCUMENTS

| | | |
|---|---|---|
| AT | 408619 B | 12/2000 |
| DE | 20 2005 006 612 U1 | 6/2005 |
| RU | 2179679 C2 | 2/2002 |
| RU | 2217788 C1 | 11/2003 |
| WO | 00/58651 | 10/2000 |

* cited by examiner

*Primary Examiner*—John Rivell
(74) *Attorney, Agent, or Firm*—Keith D. Gourley (57) ABSTRACT

A gas flow isolation device includes a gas flow isolation valve movable from an opened condition to a closed condition. The module isolation valve in one embodiment includes a rupture disk in flow communication with a flow of gas when the module isolation valve is in an opened condition. The rupture disk ruptures when a predetermined pressure differential occurs across it causing the isolation valve to close. In one embodiment the valve is mechanically linked to the rupture disk to maintain the valve in an opened condition when the rupture disk is intact, and which permits the valve to move into a closed condition when the rupture disk ruptures. In another embodiment a crushable member maintains the valve in an open condition, and the flow of gas passed the valve upon rupturing of the rupture disk compresses the crushable member to close the isolation valve.

13 Claims, 6 Drawing Sheets

MODULE ISOLATION DEVICES

STATEMENT REGARDING FEDERALLY SPONSORED RESEARCH OR DEVELOPMENT

This invention was made with Government support under DOE Cooperative Agreement No. DE-FC26-97FT96052 between Air Products and Chemicals, Inc., and the United States Department of Energy. The Government has certain rights to this invention.

BACKGROUND OF THE INVENTION

This invention relates to module isolation devices for isolating the flow of gas from one module into one or more other modules that are joined together through one or more common headers. More specifically, this invention relates to isolation devices for Ion Transport Membrane (ITM) modules particularly designed for producing purified oxygen from an oxygen-containing gas (e.g., air) or for producing synthesis gas (often referred to herein as "syngas").

The use of (ITM) modules for separating oxygen from an oxygen-containing gas, or for producing syngas is well known in the art. A representative patent disclosing ITM oxygen modules is Taylor et al. U.S. Pat. No. 5,681,373, assigned to the assignee of the present application. The Taylor et al. '373 patent is hereby fully incorporated herein by reference.

A representative patent application disclosing ITM syngas modules is Carolan et al. publication number US 20040186018, assigned to the assignee of the present application. The Carolan et al. '018 application is hereby fully incorporated herein by reference.

ITM oxygen and syngas modules typically are ceramic membranes that operate at high temperatures. These membranes operate with the process gas on one side of the membrane at a higher pressure than the process gas on the opposed side of the membrane. In common constructions a plurality of membrane modules are manifold together, both in series and in parallel, on a common header on the low-pressure gas side of the modules.

In an ITM oxygen module for separating oxygen from an oxygen-containing gas, the oxygen-containing gas is directed, under pressure, through passageways of the module to contact dense mixed conducting oxide layers of the multiple membranes making up the module. The driving force for separating the oxygen from the oxygen-containing gas is provided by creating a difference in oxygen partial pressure on opposite sides of the dense mixed conducting oxide layer of the various membranes, and the oxygen removed from the gas is then directed out of a product header, which generally is in communication with multiple ITM modules.

When the ITM modules are used for the production of synthesis gas the modules are generally heated to a temperature in the range of from 700 to 900° C., and the process temperature of the air inside the pipes that communicate with the ITM syngas modules are generally at the same operating temperature. In the production of synthesis gas a feed stock, which generally comprises a light hydrocarbon such as methane, natural gas, ethane, or other available light hydrocarbon mixtures known in the art, is introduced into passageways between the membranes of the ITM module. An oxygen-containing gas is introduced into the interior support layers of the various membranes of the module, wherein oxygen is permeated through the dense, mixed, outer conducting oxide layer of each of the membranes into engagement with the light hydrocarbon to form the synthesis gas.

If an individual membrane module fails, the high-pressure process gas will flow into the low-pressure process gas through the breach, or failure. In the case of an ITM oxygen module such failure results in a loss of purity of the permeate oxygen. In the case of an ITM syngas module, such failure results in syngas directly mixing with the source of air, which is a possible safety hazard. In addition, the failure may result in back pressuring the air feed to the other modules, may interfere with air flow or distribution and also may result in loss of the produced syngas.

From the above explanation it should be apparent that a need exists for a device or system that is capable of isolating an individual, failed module from the rest of the modules that are interconnected with the failed module by one or more common headers. Such an isolation device or system must be able to operate inside the process vessel, which is at an elevated temperature, and also must be reliable, and most preferably inexpensive in design. Shut off or isolation valves for use in conjunction with ITM modules are known in the art. These valves require an actuator to close them, and typically the actuators are pneumatic or electric solenoids triggered by an overpressure signal. These actuators are not designed for high temperature service in the inside of an ITM reactor vessel. In addition, lower cost devices would be beneficial. In this regard, a purely mechanical actuator is believed to have advantages over the use of pneumatic or electric solenoids from both a cost and reliability standpoint.

Use of a module isolation device or system will preserve product purity and also allows an ITM oxygen or syngas reactor to continue operating when individual modules fail, without compromising product purity, safety, or operability.

The problem addressed by the instant invention relates to the stopping of the flow of a gas resulting from a failed ITM module when the pressure of the gas exceeds a predetermined value. The device, including any actuator for it, must be able to operate at elevated temperatures, and must reliability permit the gas to flow through the device with an acceptable amount of restriction during normal operation.

Conventional technology using actuated valves responding to an overpressure signal from pressure transducers could accomplish the same function as the present invention, but with equipment of greatly increased complexity. Each module would require a separate pressure transducer to detect the presence of an increased pressure. Moreover, each module also would require an actuated valve. This may include the routing of pneumatic lines to each pneumatic actuator or electrical power to each electrical actuator. Hardware to perform the logic control of each actuator would also be required. For an ITM reactor, such as those employed in the preferred embodiments of this invention, the number and complexity of lines and equipment is significant.

U.S. Pat. No. 6,131,599 discloses a mechanically actuated pressure relief valve assembly controlled by a rupture disk. In the embodiment illustrated in FIG. 5 of the '599 patent, an excess pressure drop across the pressure responsive piston 212 pushes the actuating rod 216 through the rupture disk 204, thereby shutting off flow between the inlet 188 and the outlet 190. It should be noted that the rupture disk in the FIG. 5 embodiment of the '599 patent is not in flow communication with the process fluid. Stating this another way, the process fluid flows from the inlet to the outlet without in any way imposing the gas flow or pressure directly onto a surface of the rupture disk. In view of the fact that the device in the '599 patent works by a pressure difference across the piston, it is only sensitive to excessive flow through the device. In other words, it does not detect elevated pressure in the device unless that pressure is accompanied by an increased flow of gas. The pressure difference across the device is a function of the operating conditions of the device, such as the working fluid composition, the velocity of the fluid, the viscosity of the fluid and the density of the fluid. Thus, changing the operating conditions of the device changes the pressure difference across the device and hence changes the flow rate at which the rupture disk ruptures to shut off the gas flow. This is a limitation that should be avoided, and is not present in the devices of the present invention. As will be pointed out hereinafter, the isolation devices of the present invention actually shut off the flow gas at a given overpressure across the rupture disk, even in the absence of significant flow, such as when the inlet and outlet of the device are isolated.

A further deficiency in the device disclosed in FIG. 5 of the '599 patent is that it only is designed to operate with the valve seat and the actuator mechanism positioned on the outlet side of the housing. Such a device could not work on the air inlet of an ITM Syngas module. When an ITM Syngas module fails, the flow on the outlet leg will increase but the flow on the inlet leg will either stop or reverse due to the higher pressure in the module relative to the pressure of the feed air. A reversal of flow in the device disclosed in FIG. 5 of the '599 patent would force the valve 212 to stay open and would not apply any force to the rupture disk. The present invention can be employed with the valve seat located on either the inlet or outlet side of the normal flow direction, thereby making the design of the present invention more versatile.

Taylor U.S. Pat. No. 5,067,511 discloses a high-pressure fluid emergency shut-off valve. FIG. 3 of the '511 patent discloses a cross section of a typical valve in accordance with the teachings of that patent. Specifically, pressure at inlet 18 is transmitted through valve shaft 44 to an axial buckling pin 14. If the pressure is high enough, the pin 14 buckles to thereby allow the valve piston 47 to seat in valve seat 38, stopping fluid flow between inlet port 18 and outlet port 24. For pressure to be transmitted along valve shaft 44, sliding seals 48 are provided to maintain a pressure difference between the two ends of the shaft. The use of a buckling pin, as disclosed in the '511 patent, is materially different from the use of rupture disks in the devices of the present invention. Moreover, the required use of sliding seals 48 in the construction disclosed in the '511 patent makes such an arrangement unsuitable for use in high temperature applications, which are the preferred applications for the devices of the present invention.

Huff U.S. Pat. No. 4,240,458 discloses an excess pressure shut-off valve. FIGS. 2 and 3 of the '458 patent show a cross section of a typical valve in accordance with the teachings of that patent. Excess pressure in space 20 causes diaphragm 24, which is a bi-stable snap-acting disk, to snap into the other stable position. This moves valve shaft 64 upward in the figure to move O-ring 76 into sealing engagement with sealing surface 18, thereby shutting off flow between inlet 14 and outlet 16 of the device. A principal drawback of the design disclosed in the '458 patent is that the range of motion of the bi-stable snap-acting disk is small, being limited by the two stable positions of the disk. This results in a limited range of motion of the valve and hence only a limited opening of the valve into its fully opened position. In addition, any wear of the O-ring cannot be compensated for by additional axial movement of the valve shaft 64. The isolation valves employed in the module isolation devices of the present invention do not have these undesired, range-of-movement limitations.

Westman U.S. Pat. No. 5,810,057, assigned to the same assignee as the instant application, discloses a pressure vessel fill protective device consisting of a sliding piston 28, as shown in FIG. 1 of the patent. Port 58 is in flow communication with the head space of a vessel and also with a rupture disk 90. Port 56 is in flow communication with the head space of a vessel. In the event the head space of a vessel becomes over pressurized, the rupture disk 90 fails, depressurizing the space above the piston and thereby causing a force to be exerted on pin 40 to thereby cause that pin to fail. This results in the piston sliding upward to close off flow communication between ports 22 and 24. The system disclosed in the '057 patent requires the use of a piston-type valve, which requires sliding seals that may not be amenable to use at elevated temperature conditions. As pointed out earlier, the most desired uses of the module isolation devices of this invention are in connection with ITM modules that operate at elevated temperature conditions.

Brazier et al. U.S. Pat. No. 6,484,742 discloses a pressure-activated shut-off valve, as illustrated in FIG. 11. Excessively high pressure will be transmitted through the shaft 308, causing pin 216 to buckle. As pin 216 buckles, the valve plug 314 seats against the valve seat 316 to stop fluid flow. To generate a pressure difference sufficient to move the valve shaft 308, a good pressure seal is required around that shaft as it passes through valve body 302. It is highly desirable to design a system which does not require the use of any seals around the valve shaft, particularly for systems intended for use in high temperature applications. For operation at high elevated temperature, the valve and shaft disclosed in the '742 patent would need to be carefully constructed to prevent them from binding to each other. Alternatively, the seal area would have to be carefully insulated from any hot process fluid to prevent that area from becoming too hot. Also, unlike the present invention (as will become apparent from the discussion which follows) the pin that is required to buckle is not directly in the flow path through the cartridge assembly.

BRIEF SUMMARY OF THE INVENTION

Gas flow isolation devices or systems in accordance with this invention isolate the flow of gas from one module into one or more other modules that are joined to the one module through one or more common headers. These gas flow isolation devices or systems include an inlet passage and an outlet passage, with the inlet passage being adapted to communicate with an outlet from one of the modules to receive a flow of gas therefrom. The outlet passage communicates with the inlet passage for receiving the flow of gas from the module and directing the gas out of the isolation device, preferably into an outlet header adapted to communicate with isolation devices for other modules. Optionally, a flow restricting orifice can be provided through which the gas is required to pass as it enters the outlet header to reduce the pressure of the gas in that header. A valve system is movable from an opened condition to a closed condition to prevent the flow of gas from the inlet passage to the outlet passage when the pressure of gas in the isolation device exceeds a predetermined level.

The valve system in accordance with certain embodiments of this invention employs a rupture disk, a valve seat and a valve stem. The rupture disk has a first face and a second face, and the first face is in flow communication with the outlet from the module when the outlet is placed in flow communication with the inlet passage of the housing and the valve system is in an opened condition to permit the flow of gas form the inlet passage to the outlet passage of the isolation device. In this opened condition of the valve system the flow of gas also impinges upon the first face of the rupture disk to impose a pressure thereon. The second face of the rupture disk is in flow communication with a chamber maintained at a desired low pressure, and the rupture disk is designed to rupture when a predetermined pressure differential is established across the rupture disk. The valve seat is positioned between the inlet passage of the housing and the outlet passage and is located upstream of the rupture disk, that is, upstream of the direction of gas flow that acts upon the rupture disk. The valve stem of the value system has opposed first and second ends, with the first end being mechanically linked with the first face of the rupture disk and the second end being coupled to a valve member. The valve member is spaced from the valve seat when the first end of the valve stem is mechanically linked with the rupture disk to permit the flow of gas from the inlet passage to the outlet passage of the housing, and also into engagement with the first face of the rupture disk. The rupture disk ruptures upon a predetermined pressure differential across it being exceeded, thereby causing the valve member to seat against the valve seat and terminate the flow of gas from the inlet passage to the outlet passage and also through the rupture disk.

In accordance with certain embodiments of the invention the valve stem is vertically oriented and the first end of the valve stem is mechanically linked with the first face of the rupture disk by engaging that face. Thus, rupturing of the disk causes the valve stem, including its associated valve member, to move into engagement with the valve seat by the force of gravity. In addition, the flow of gas responsible for rupturing the disk creates a pressure drop across the valve member and this pressure drop assists in seating the valve member against the valve seat.

In certain embodiments of the invention the chamber that is maintained at a desired low pressure and that is in communication with the second face of the rupture disk is maintained in flow communication with low-pressure product gas flowing in the outlet header.

In certain embodiments of the invention the chamber that is maintained at a desired low pressure and that is in communication with the second face of the rupture disk is maintained at that pressure by employing a separate low-pressure gas therein. In this latter embodiment it is desirable to include a check valve that closes upon rupturing of the rupture disk, to thereby prevent the low-pressure gas in this latter chamber from entering into and contaminating the product gas in the outlet header.

In certain preferred embodiments of this invention the module is an Ion Transport Membrane module for separating oxygen from an oxygen-containing gas (e.g., air) and directing the purified oxygen into the inlet passage of the isolation device and then through the outlet passage into the outlet header for subsequent collection and use.

In other preferred embodiments of this invention the module is an Ion Transport Membrane module for producing syngas and the inlet passage of the module isolation device is in communication with spent, oxygen-containing gas exiting the module.

In accordance with embodiments of this invention wherein the module is an Ion Transport Membrane module for producing syngas, a second isolation device is provided for directing an oxygen-containing gas (i.e., a fresh gas (e.g., air) feed) to the module. The oxygen that permeates through the dense layer of the membranes of the module is contacted by a suitable feed stock, e.g., methane or other low hydrocarbon gas, to form, or produce, syngas. The outlet from the ITM syngas module transmits spent gas (i.e., the gas remaining after giving up oxygen to the feed stock) to the inlet of the first isolation device (i.e., a spent gas isolation device) and it is this spent gas that is directed from the inlet passage of the first spent gas isolation device to the outlet passage of that device when the valve system therein is in an opened condition. The second or fresh gas isolation device employs a valve system very similar to that employed in the spent gas isolation device, and is designed to close in the event of a module failure to prevent the back flow of syngas into the fresh gas supply. In a like manner, the valve system in the spent gas isolation device is designed to close in the event of a failure of the ITM module to thereby prevent syngas from intermixing with the spent gas and being directed out of the outlet passage of the spent gas isolation device.

In certain embodiments of the invention, the valve in the fresh gas isolation device includes a rupture disk having a first face that is in flow communication with the oxygen-containing gas inlet of the ITM module and the fresh gas outlet passage of the fresh gas isolation device when the valve system in that isolation device is in an opened condition. In this latter condition, back-pressure resulting from any backflow of syngas from the Ion Transport Membrane module is directly imposed on the first face of the rupture disk in the fresh gas isolation device. The second face of the rupture disk of the fresh gas isolation device is in flow communication with a chamber maintained at a desired low pressure, and the rupture disk is designed to rupture when the back-pressure exceeds a predetermined pressure level, i.e., when the pressure drop across the rupture disk exceeds a predetermined level.

In certain embodiments of the invention the valve assembly in the fresh gas isolation device includes a valve seat and a valve stem similar to that employed in the first or spent gas isolation device. That is, the valve stem has opposed first and second ends; the first end being mechanically linked with the first face of the rupture disk, preferably by engaging said first face, and the second end being coupled to a valve member. When the pressure differential across the rupture disk exceeds a predetermined value, caused by the back-flow of syngas from a failed module, the rupture disk fails, thereby causing the valve member to seat against the valve seat by both the force of gravity and the force imposed on the valve member by the pressure drop across the valve member created by the flow of syngas from the module.

In accordance with certain embodiments of this invention, a flow restrictor (e.g., a flow-restricting orifice) can be provided in the fresh gas inlet passage into the fresh gas isolation device and in the spent gas outlet passage of the spent gas isolation device. When such flow restrictors are employed, either a fresh gas header communicating with the fresh gas inlet passage or the spent gas header communicating with the spent gas outlet passage of the spent gas isolation device can be employed as the low pressure chamber or header communicating with the second face of the rupture disk in the respective fresh gas and spent gas isolation devices.

If desired, the low-pressure chamber in communication with the second side of the rupture disk in both the fresh gas isolation device and the spent gas isolation device can be in communication with a low-pressure gas that is completely isolated from the fresh gas flowing into the fresh gas isolation device and the spent gas exiting the spent gas isolation device, respectively. If the fresh gas feed header does not constitute the low-pressure header communicating with the second face of the rupture disk in the fresh gas isolation device, a check valve would be needed to prevent the fresh gas feed to a malfunctioning ITM module from passing into the low pressure header through the ruptured disk. In a like manner, if the spent gas header does not constitute the low-pressure header, a check valve would be needed in the spent gas isolation device to prevent spent gas from the spent gas header passing through the ruptured disk into the low pressure header.

Although embodiments of this invention wherein the valve stem is mechanically linked to the ruptured disk may function well for certain applications, there is a drawback to such a construction. In particular, as gas flow moves from the inlet passage to the outlet passage of the isolation device that flow can act upon the valve to cause the valve to flutter thereby causing the end of the valve stem engaging the rupture disk to vibrate against the disk. This can result in a premature rupturing of the rupture disk, when, in fact, the ITM module is still functioning in a normal manner.

In order to overcome the flutter problem associated with the above-described embodiments of the invention, alternative, and more preferred embodiments of this invention do not include the rupture disk as part of the valve system. Rather, the valve stem is maintained out of engagement with the rupture disk when the valve is in a normally opened condition. Specifically, the valve system includes a crushable member that normally biases the valve system into an open condition. This crushable member is independent of the rupture disk. When the crushable member is crushed, the valve system moves into a closed condition. In these alternative, preferred embodiments, the valve stem is out of force-transmitting engagement with the rupture disk when the valve stem is in an opened condition, and, in a preferred construction, does not engage the rupture disk at any time. The crushable member is designed to crush after the pressure differential across the rupture disk causes the rupture disk to fail. Specifically, after the rupture disk fails (i.e., by rupturing) the flow of gas through the rupture disk, from the high-pressure side to the low-pressure side thereafter, creates a pressure difference across the valve member, which forces the valve member downwardly to engage against its corresponding valve seat. In the most preferred embodiment, even in the closed condition of the valve system the valve stem does not break the plane occupied by the rupture disk, prior to rupturing.

In the most preferred embodiments of this invention, the crushable member is a compressible spring, which is capable of also expanding after being compressed to move the valve assembly into a normally opened position after the flow of gas from the module into the isolation devices(s) is discontinued.

In certain constructions of this invention the crushable member is supported against axial movement on a porous or perforated support surface that is connected against movement in the isolation device and that includes a passage in axial alignment with the valve stem. An actuating member is connected to the valve stem and is movable axially with the valve stem for engaging and crushing the crushable member after the rupture disk has been ruptured.

The embodiments of this invention employing crushable members to normally maintain the valve assembly in an opened condition can be employed in both a single module isolation device that commonly is employed in connection with an ITM oxygen module, and/or in one or both of the fresh gas and/or spent gas module isolation devices generally employed in connection with an ITM syngas module.

BRIEF DESCRIPTION OF THE DRAWINGS

The invention will be described by way of example with reference to the accompanying drawings, in which.

DETAILED DESCRIPTION OF THE INVENTION

Figure 1:
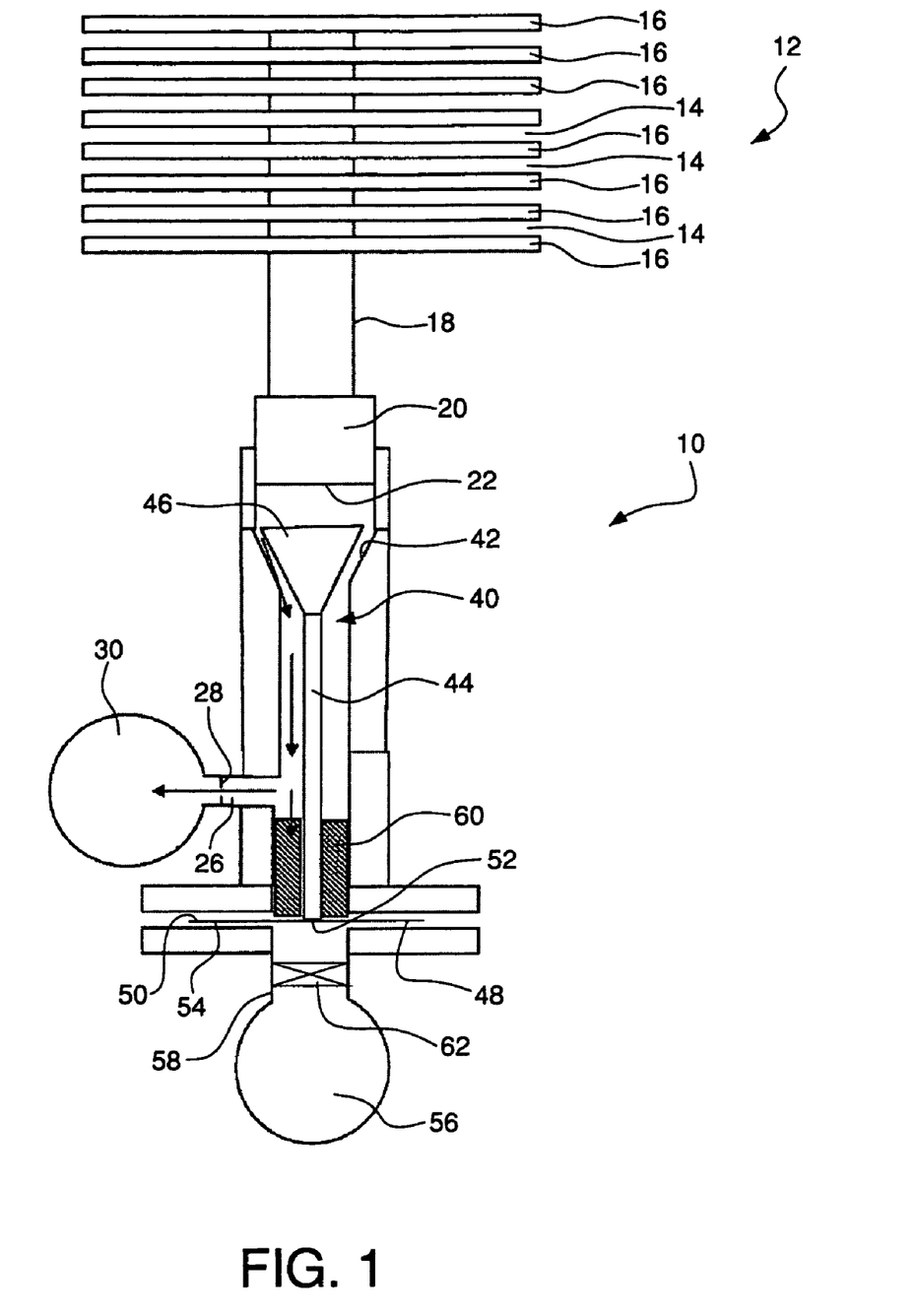
FIG. 1 is a schematic view of one embodiment of a module isolation device in accordance with this invention.

Referring to FIG. 1, a module isolation device in accordance with one embodiment of this invention is illustrated at 10. The module isolation device is employed to receive oxygen permeate from an Ion Transmission Membrane (ITM) oxygen module 12. Exemplary ITM oxygen modules are disclosed in U.S. Pat. No. 5,681,373, the subject matter of which is hereby fully incorporated by reference. Also, as discussed earlier, ITM oxygen modules are described in Taylor et al. U.S. Pat. No. 5,681,373. This latter patent previously has been incorporated by reference herein.

The oxygen permeate from the ITM oxygen module 12 is the purified oxygen removed from an oxygen-containing gas (e.g., air) that initially is directed into passageways 14 provided between the membrane units 16 of the module. The membrane units 16 include a dense, mixed conducting oxide layer through which oxygen permeates. The oxygen permeate, i.e., the purified oxygen, is directed out of the module 12 through ceramic stack manifold 18 and a ceramic to metal seal 20 into inlet 22 of the module isolation device 10.

Still referring to FIG. 1, the module isolation device 10 includes an outlet passage 26 downstream of the inlet passage 22 for receiving the flow of permeate oxygen. Optionally, the outlet passage 26 can include a flow restricting orifice 28 through which the oxygen passes prior to entering an oxygen collecting header or plenum 30. The flow restricting orifice 28, if needed, is designed to provide sufficient back pressure in the event of increased flow from the module 12, such as from a leak, to increase the pressure acting on a rupture disk (described in detail hereinafter) to a value higher than the pressure encountered during normal operation of the module 12. The higher pressure resulting from a malfunction of the ITM oxygen module 12 will rupture the rupture disk to isolate the module, as will be discussed in detail later in this application. It should be understood that the oxygen collecting plenum 30 generally is associated with one or more additional ITM oxygen modules that are arranged in series or parallel, such that the oxygen permeate from all of the modules flow into and through the common oxygen collecting plenum 30.

A unique feature of this invention resides in the construction and operation of a module isolation valve 40 forming part of the module isolation device 10. The valve 40 is designed to permit the flow of oxygen permeate from the inlet passage 22 through the outlet passage 26 when in an opened condition and to prevent the flow of the oxygen permeate to the outlet passage when in a closed condition.

The module isolation valve 40 includes a valve seat 42, a valve stem 44 including a valve member 46 at one end thereof, and a rupture disk 48 having a first face 50 engaging an opposed end 52 of the valve stem 44. The rupture disk 48 includes a second face 54 in flow communication with a low-pressure header 56 through a conduit 58. If desired, heat insulation material 60 optionally can be provided around the valve stem 44 adjacent the rupture disk 48.

It should be noted that when insulation material 60 is employed it is a porous material, e.g. alumina fiber, to permit flow communication of the oxygen permeate flowing into the module isolation device 10 through the inlet 22 with the first face 50 of the rupture disk 48 when the module isolation valve 40 is in an opened condition. The flow of oxygen permeate is schematically indicated by the arrows depicted in FIG. 1.

It should be noted that the specific construction of the ceramic to metal seal 20 does not constitute a limitation on the broadest aspects of this invention. Exemplary ceramic to metal seals usable in this invention are described in U.S. Pat. No. 6,302,402, the subject matter of which is hereby incorporated by reference.

In the illustrated embodiment, the valve member 46 is in the form of a globe valve, however, other types of linear-action valves, e.g., gate valves, angled valves, etc., would work equally well in the invention. Exemplary types of valves usable in this invention are disclosed in standard references, such as Perry's Handbook of Chemical Engineering, Chapter 10. It should be understood that the materials employed to construct the module isolation valve 40 need to be chosen to be compatible for service in the hot oxygen product stream. An exemplary material is a nickel superalloy, such as Haynes 214 or Haynes 230, sold by Haynes International of Kokomo, Ind. Alternatively, parts of the valve could be constructed of structural ceramics such as alumina, silicon carbide or silicon nitride.

The rupture disk 48 needs to be designed for proper operation at the temperature of use in the system. This disk 48 either can be exposed to the operating temperature of the oxygen process stream, or it can be insulated from the process stream, such as by employing insulation material 60, and thereby operate at a lower temperature.

Having described the structural arrangement of elements in the module isolation device 10, the manner in which the device functions to isolate the module 12 from other modules joined to the module isolation device 10 through one or more common headers (e.g., oxygen collecting plenum 30) will now be described.

During an upset condition, such as when a large leak develops in the ITM module 12, the flow exiting the module into the inlet passage 22 of the module isolation device 10 will increase. Due to the flow resistance of the module isolation device 10 and the oxygen collecting plenum or manifold 30, the pressure inside the module 12 also will increase. If a flow restrictor is employed between the module 12 and the oxygen collecting plenum or header 30, (e.g., flow restricting orifice 28) the pressure inside the module 12 will increase even further. This increase in pressure is transmitted through the isolation device 10 against the first face 50 of the rupture disk 48. This pressure increase resulting in an overpressure condition for the rupture disk 48 will cause the disk to rupture, or burst. When the rupture disk ruptures it no longer supports the lower end 52 of valve stem 44, and the stem will drop under the force of gravity, the pressure drop across the valve member, and the viscous drag of the gas around the valve member 46 in the case of certain types of valves, such as globe valves. In this latter position the valve member 46 seats against valve seat 42 to close valve 40 and stop the flow of gas exiting from the ITM oxygen module 12 to the oxygen collecting plenum 30. This causes the pressure on the upstream side of the valve member 46 to further increase to the pressure of the high-pressure gas, which further assists in maintaining a good seal between the valve member 46 and the valve seat 42.

Once the valve member 46 seats against the valve seat 42, the oxygen collecting plenum or header 30 is isolated from the leak, thereby preventing contamination of the purified oxygen from the failed module 12.

In the illustrated embodiment, wherein the low pressure header 56 is a separate header from the oxygen collecting plenum or header 30, a check valve in the conduit 58, schematically indicated at 62, is desired to prevent a backflow of gas from the low pressure header 56 into the permeate oxygen plenum 30 after the rupture disk 48 fails. That is, the check valve 62 precludes low pressure gas from the header 56 from passing through the opening in the ruptured disk 48 and into the oxygen collecting plenum 30 through outlet passage 26 of the isolation device 10.

Figure 2:
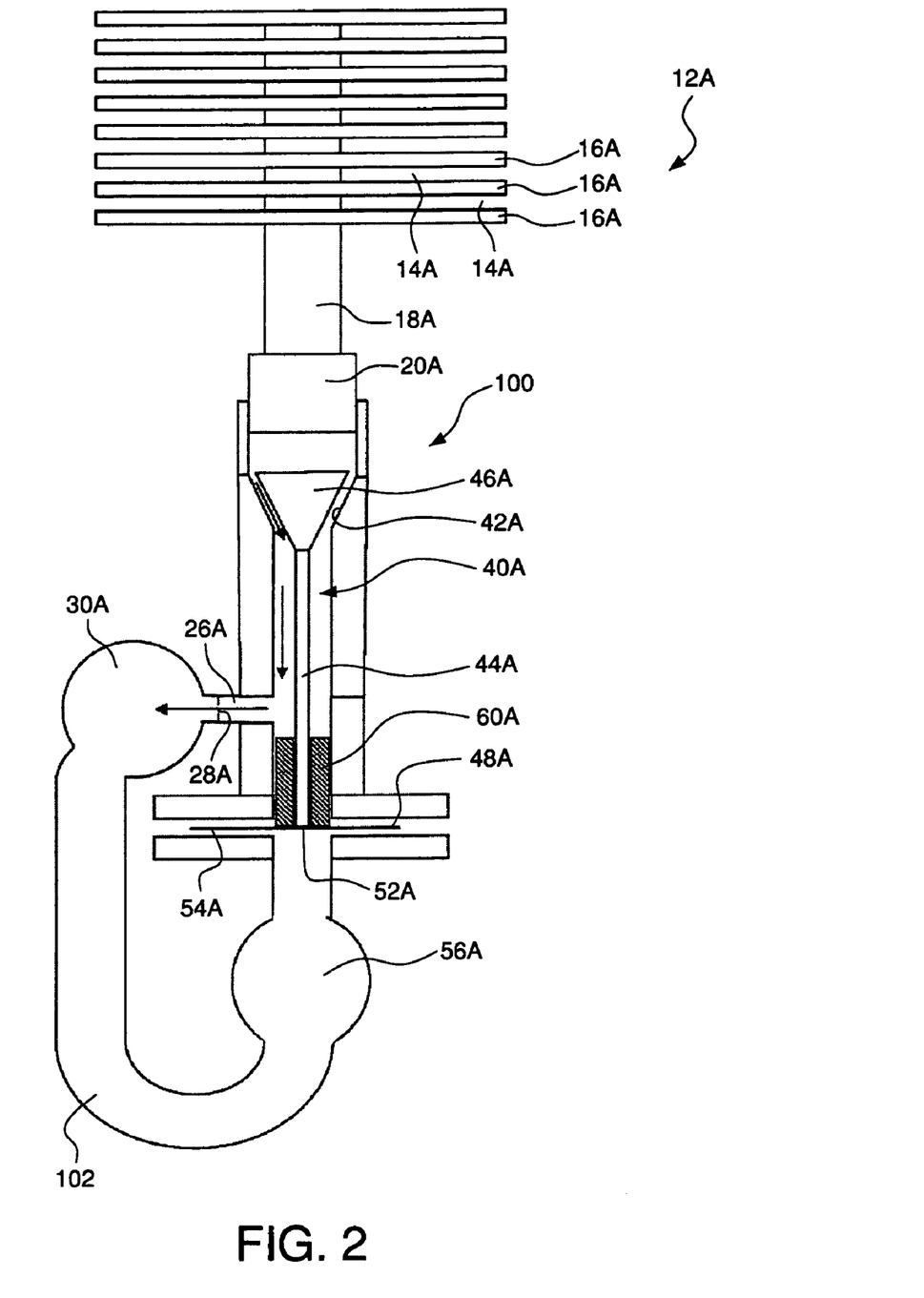
FIG. 2 is a schematic view of an alternative embodiment of a module isolation device in accordance with this invention.

Referring to FIG. 2, a module isolation device 100 is depicted, which includes a number of elements that are the same as the elements employed in the module isolation device 10. The elements in the module isolation device 100 that are the same as elements in the module isolation device 10 are identified by the same numerals, but with a suffix "A." Suffice it to state that the module isolation device 100 disclosed is FIG. 2 functions to receive permeate oxygen from ion transport membrane module 12A in the same manner as described above in connection with the module isolation device 10 disclosed in FIG. 1.

The only difference between the module isolation device 100 and the module isolation device 10 is in the manner in which the low pressure header 56A of the module isolation device 100 is provided to communicate with the second face 54A of the rupture disk 48A. Specifically, in the module isolation device 100 the oxygen collecting plenum or header 30A is placed in direct communication with the second face 54A of the ruptured disk 48A through a conduit 102 of any desired configuration, whereby the low pressure flow of oxygen into the plenum 30A through flow restricting orifice 28A also constitutes the low pressure gas communicating with the second face 54A of the ruptured disk 48A. Thus, the oxygen collecting plenum 30A actually functions as the low pressure header in the module isolation device 100. By employing this latter arrangement the purity of the oxygen in the oxygen collecting plenum 30A is ensured, and there is no need to provide a check valve, similar to the check valve 62 employed in the module isolation device 10, in order to prevent the backflow of low pressure gas through the ruptured disk 48A into the oxygen collecting plenum 30A. Such a check valve is not required because the gas that is capable of flowing through the ruptured disk 48A in a reverse direction actually is the same purified oxygen that is collected in the oxygen collecting plenum 30A.

Figure 3:
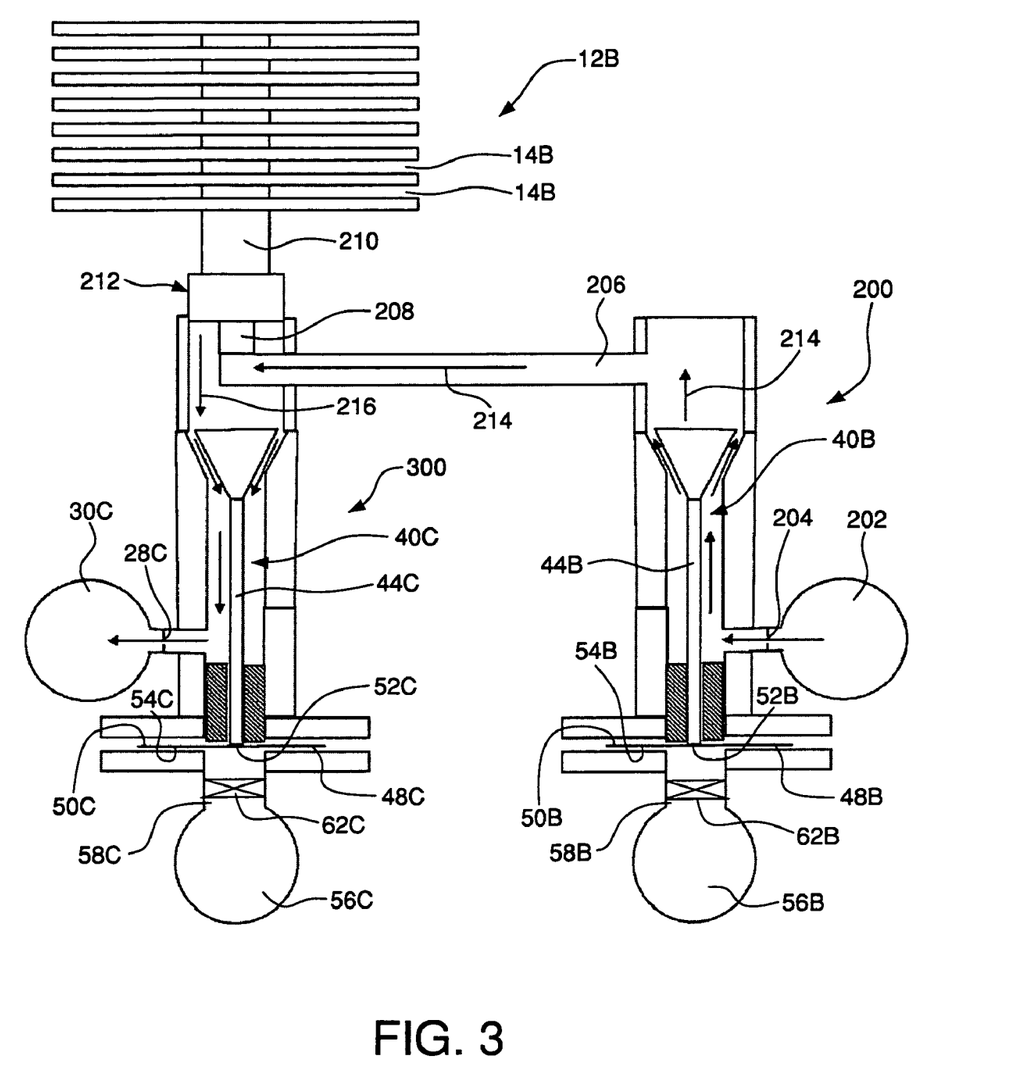
FIG. 3 is a schematic view of another embodiment of a module isolation device in accordance with this invention.

Referring now to FIG. 3, a pair of module isolation devices 200 and 300 are connected with an ITM syngas module 12B on the airfeed line into the module and the spent air effluent from the module, respectively. Components of module isolation devices 200, 300 that operate in the same manner as components in the module isolation device 10 will be referred to by the same numerals, but with the suffixes "B" and "C," respectively. The operation of ITM syngas modules are well known in the art and the specific construction thereof does not constitute a limitation on the broadest aspects of this invention. During operation of an ITM syngas module 12B a high-pressure synthetic gas, e.g., methane or other light hydrocarbon gas, is directed through passageways 14B of the module 12 and into engagement with permeate oxygen extracted from air fed into the module to thereby form the syngas.

In the discussion that follows the module isolation device 200 will sometimes be referred to as the "fresh gas isolation device," "fresh air isolation device" or by words of similar import, and the module isolation device 300 will sometimes be referred to as the "spent gas isolation device," "spent air isolation device," "effluent isolation device" or by words of similar import. Although the description that follows describes a preferred embodiment in which the fresh oxygen-containing gas is air, in accordance with the broadest aspects of this invention other oxygen-containing gases can be employed.

In the illustrated embodiment, a fresh air feed header 202 receives fresh air to be directed into the ITM syngas module 12B. This fresh air feed is directed into the fresh air isolation device 200 through an optional flow-restricting orifice 204, and then through outlet conduit 206 of the device. The outlet conduit 206 communicates with air feed inlet 208 of the module 12B. The air feed inlet 208 is provided by a ceramic conduit or tube that is concentric with an outer ceramic conduit or tube 210 that is connected to a ceramic to metal seal 212. It is through this outer conduit 210 that the spent gas (e.g., the gas from which oxygen ions have been removed in the ITM syngas module 12B) is directed into the spent air isolation device 300.

It should be understood that the construction and operation of the spent air module isolation device 300 is identical to the construction and operation of the oxygen permeate isolation device 10 illustrated in FIG. 1, with the exception that the gas being isolated by the isolation device 300 is the spent air that gave up its oxygen to the synthetic gas, as opposed to pure oxygen removed from the air by the ITM oxygen module 12. However, the structural features and operation of the module isolation device 300 is otherwise identical to that described above in connection with the module isolation device 10.

As noted above, the air feed into module 12B and the spent air effluent from that module are connected to the module through the concentric ceramic tubes 208, 210, respectively. Each of these tubes is connected to metal piping through a ceramic to metal seal 212.

Still referring to FIG. 3, the module isolation device 200 employs a module isolation valve 40B upstream of the ceramic to metal seal 212 for the air feed leg. The module isolation device 300 employs a module isolation valve 40C for the spent air effluent from the module 12B, downstream of the ceramic to metal seal 212 for the spent air effluent leg. The flow of the fresh airfeed into the inner concentric tube 208 of the module 12B is illustrated by arrows 214, and the flow of spent effluent from the module 12B is illustrated by arrows 216.

During normal operation, both of the module isolation valves 40B, 40C are opened. Air feed passes from the airfeed header 202 through optional flow restricting orifice 204, through the airfeed module isolation valve 40B and through outlet conduit 206 communicating with the air feed inlet 208 into the ITM syngas module 12B.

Spent air exiting the module 12B (as depicted by arrows 216) passes through the spent air module isolation valve 40C of the spent air isolation device 300, through an optional flow-restricting orifice 28C and into spent air header or plenum 30C. The flow-restricting orifices 28C, 204, if needed, are designed to provide sufficient back pressure in the respective isolation devices 300, 200 in the event of an increased flow from the module 12B, such as from a leak, to thereby increase the pressure acting on the rupture disks 48 B, 48C in both module isolation devices 200, 300 to values sufficiently above the pressures normally encountered under steady state operating conditions.

As in the embodiments illustrated in FIGS. 1 and 2, the valve stems 44B, 44C of the module isolation valves 40B, 40C in the module isolation devices 200, 300 are mechanically linked to the first face 50B, 50C of the rupture disks 48B, and 48C, respectively. In the illustrated embodiment, the mechanical linkage is created by the first face 50B, 50C of the rupture disks 48B, 48C actually supporting ends 52B, 52C of the valve stems 44B, and 44C, respectively.

In the event of a malfunction of the module 12B, resulting in the backflow of syngas through both the inner and outer concentric tubes 208, 210, respectively, the high pressure backflow causes the rupture disks 48B, 48C to rupture, resulting in a closure of the respective module isolation valves 40B, 40C in the module isolation devices 200, 300. This will prevent contamination of the spent air effluent and the fresh air infeed by the syngas.

As in the earlier described embodiments, the second face 54B, 54C of the rupture disks 48B, 48C in the fresh air isolation device 200 and in the spent air isolation device 300, respectively, are in full communication with respective low pressure headers 56B, 56C. In the embodiment illustrated in FIG. 3, the low pressure headers 56B, 56C are separate from the fresh air feed header 202 into the module isolation device 200 and the spent air or effluent collection plenum 30C of the module isolation device 300. In this arrangement, it is desirable to employ check valves 62B, 62C in conduits 58B, 58C that communicate the low pressure headers 56B, 56C with the second faces 54B, 54C of the rupture disks 48B, 48C, in the same manner as described above in connection with the module isolation device 10 illustrated in FIG. 1. Specifically, these check valves 62B, 62C will prevent the flow of gas from the low pressure headers 56B, 56C into the airfeed header 202 of the fresh air isolation device 200 and into the spent air header 30C of the spent air isolation device 300, respectively.

Still referring to FIG. 3, in an alternative, and more preferred arrangement, the air feed header 202 is employed as the low pressure header in communication with the second face 54B of the rupture disk 48B in the fresh air module isolation device 200, and the effluent plenum or header 30C is employed as the low pressure header in communication with the second face 54C of the rupture disk 48C in the spent air isolation device 300. This is achieved by providing conduits communicating the respective airfeed header 202 and the effluent air header 30C with the region underlying the second faces 54B, 54C of the respective ruptured disks 48B, 48C, in the same manner that conduit 102 is employed in the module isolation device 100 illustrated in FIG. 2. In this latter arrangement there is no need for any check valves to prevent the flow of gas from the low pressure region underlying the rupture disks 48B, 48C into the air feed header 202 and spent air header 30C of the module isolation devices 200 and 300, respectively, since the low pressure region 56B in the module isolation device 200 would contain the same air supply as in the air feed header 202, and the low pressure region 56C in the module isolation device 300 would contain the same effluent as in the spent air header 30C of that module isolation device.

By way of brief description, and still referring to FIG. 3, the backflow of syngas resulting from a malfunction of the module 12B will cause a significant pressure increase in the module isolation devices 200 and 300, to thereby cause the rupture disks 48B, 48C therein to rupture and the corresponding module isolation valves 40B, 40C to close, in a manner similar to that described in connection with the module isolation device 10 depicted in FIG. 1 and the module isolation device 100 depicted in FIG. 2. The closing of valves 40B, 40C isolates the undesirable backflow of syngas from a damaged module 12B into either the fresh air feed into isolation device 200 or the effluent out of the isolation device 300.

Figure 4:
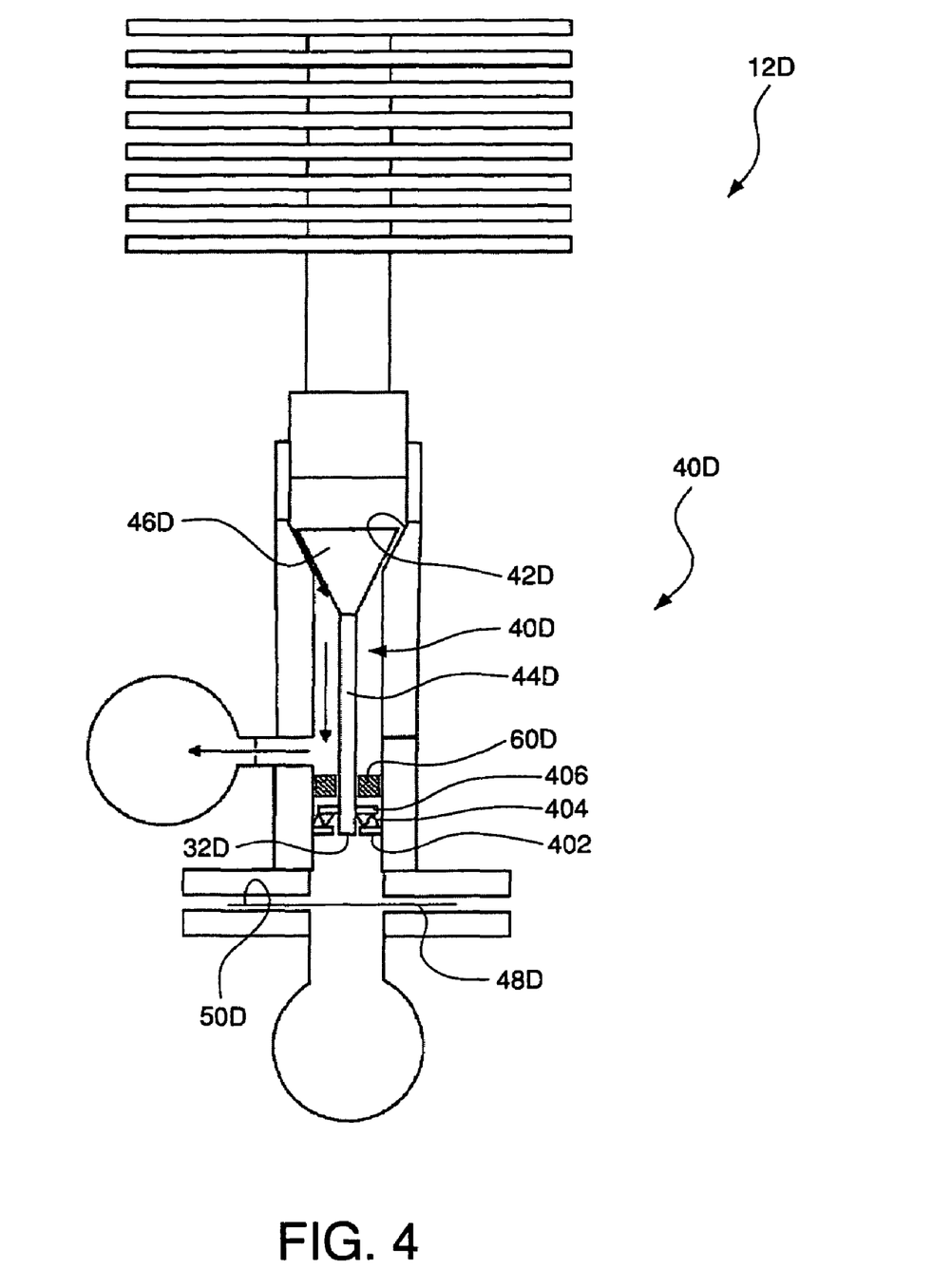
FIG. 4 is a schematic view of a module isolation device similar to that illustrated in FIG. 1, but employing a more preferred valve system.
Figure 5:
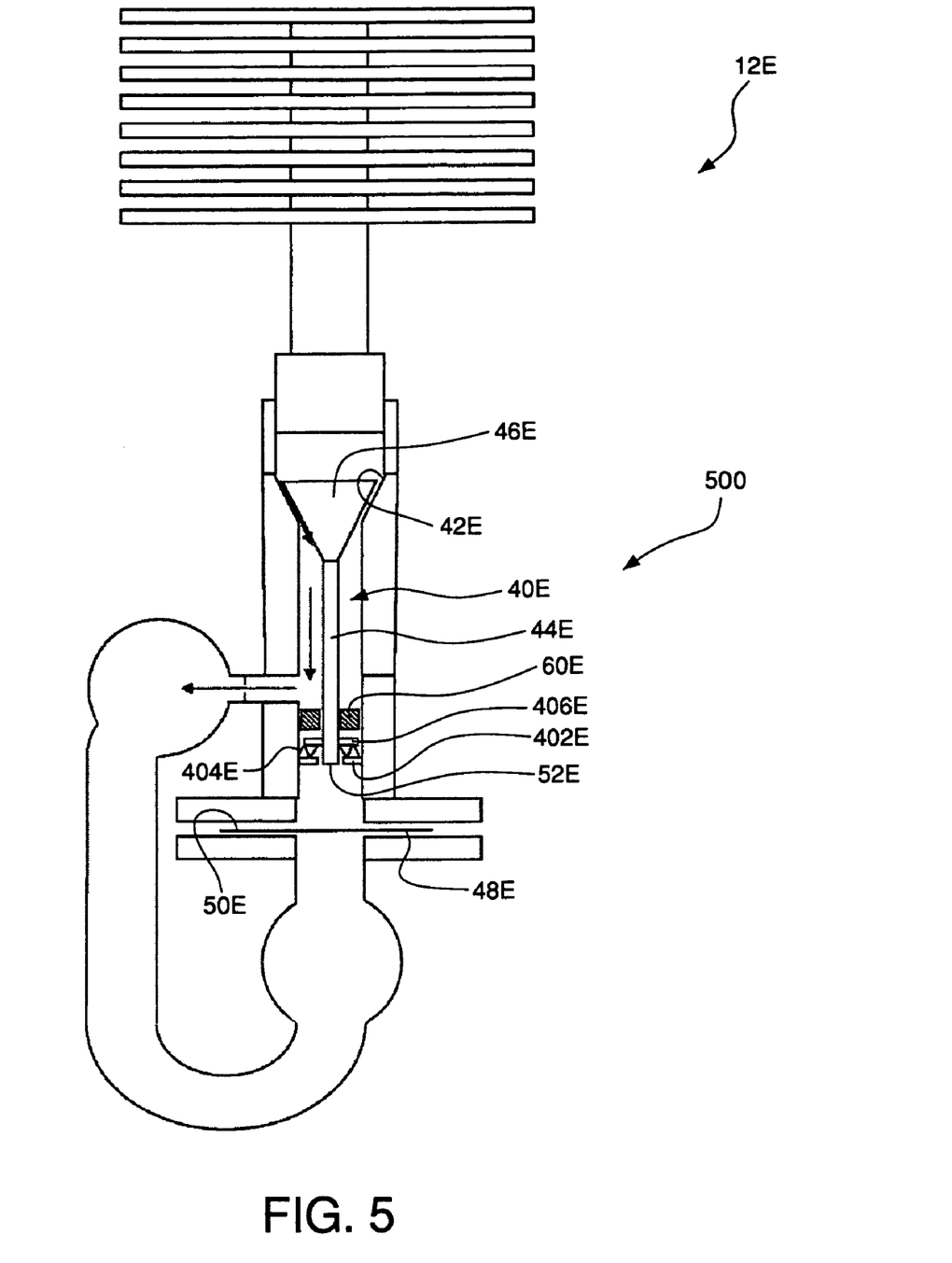
FIG. 5 is a schematic view of a module isolation device similar to FIG. 2, but employing the more preferred valve system illustrated in FIG. 4.
Figure 6:
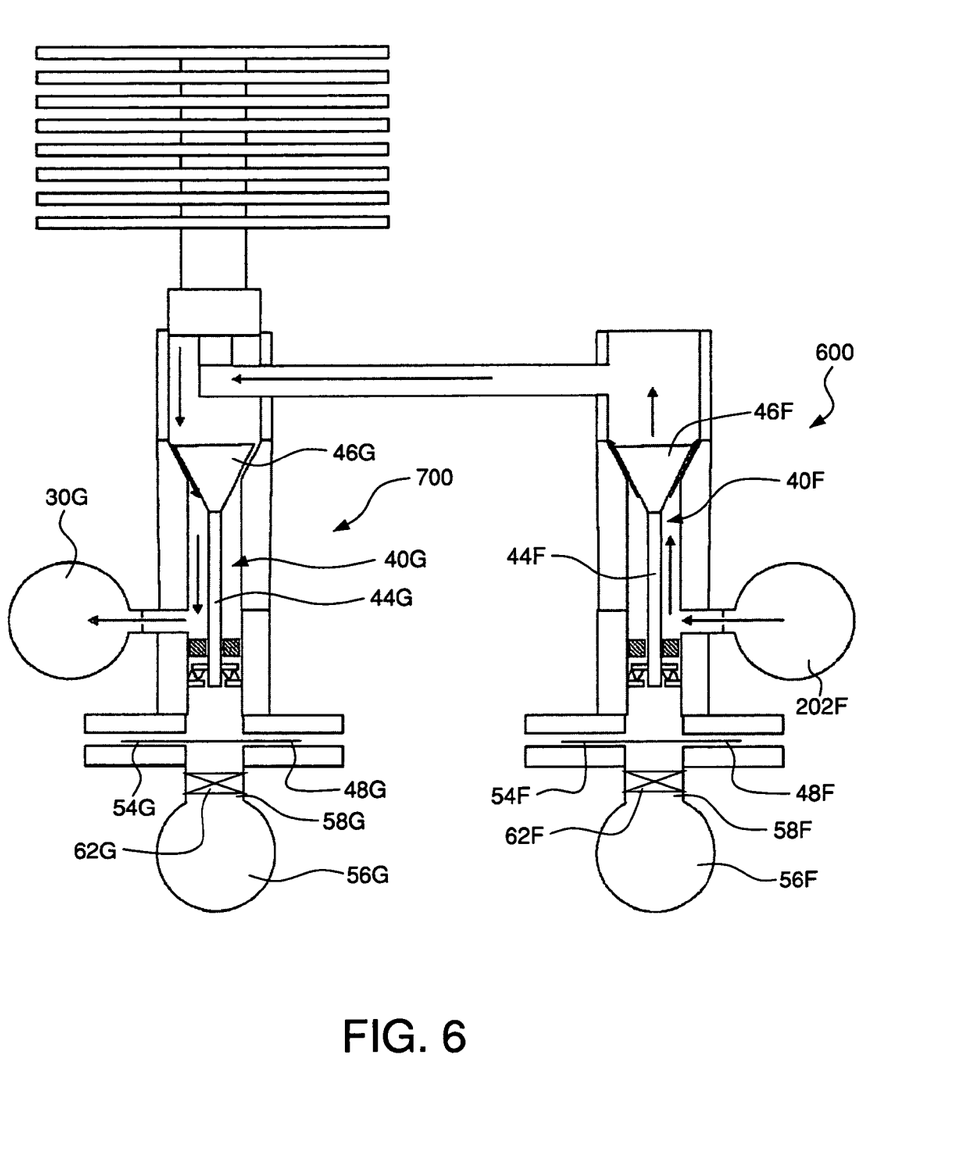
FIG. 6 is a schematic view of a module isolation device similar to FIG. 3, but employing the more preferred valve system illustrated in FIG. 4.

Referring to FIGS. 4-6, module isolation devices similar to module isolation devices 10, 100, 200 and 300, respectively, are depicted. The embodiments depicted in FIGS. 4-6 represent the most preferred embodiments and overcome a problem that potentially exists with the embodiments illustrated in FIGS. 1-3.

Specifically, in the embodiments depicted in FIGS. 1-3, the ruptured disks constitute part of the described module isolation valves 40, 40A, 40B and 40C, and in the disclosed embodiments, actually engage the lower ends of their respective valve stems 44, 44A, 44B and 44C to normally bias the isolation valves into their opened condition.

It was determined that during operation of the module isolation devices 10, 100 and 300, the flow of gas against the valve members; particularly valve members 46, 46A and 46C, during normal operation of the modules 12, 12A or 12C caused the valve stems 44, 44A and 44C to vibrate against the rupture disks 48, 48A, 48C thereby creating the possibility of premature failure of those rupture disks. In other words, the vibration of the valve stems 44, 44A and 44C against the rupture disks 48, 48A and 46C, respectively, can cause those rupture disks to fail, and thereby cause the valve members 46, 46A and 46C to seat against their respective valve seats 42, 42A and 42C, even if no malfunction of the module 12, 12A or 12C occurs. This clearly is undesirable.

FIGS. 4-6 disclose module isolation devices that are identical to the module isolation devices 10, 100, 200 and 300, respectively, except for the construction of the module isolation valves. Specifically, wherein the module isolation valves 40, 40A, 40B and 40C employed in the embodiments illustrated in FIGS. 1-3 include respective ruptured disks 48, 48A, 48B and 48C as a component thereof, the module isolation valves employed in the embodiments illustrated in FIGS. 4-6 do not include the rupture disk as a component thereof. In fact, as will be explained hereinafter, the valve stem of the valve assemblies illustrated in the embodiments of FIGS. 4-6 do not engage the respective rupture disks at all, and actually are spaced from the rupture disks during movement between opened and closed conditions of the valves.

Referring specifically to FIG. 4, a module isolation device 400 is depicted for use in connection with an Ion Transport Membrane oxygen module 12D, in the same manner as the module isolation device 10. Components of the embodiment illustrated in FIG. 4 that are identical to components of the embodiment illustrated in FIG. 1 are identified by the same numerals, but with the suffix "D" and in many cases will not be discussed in detail herein, for purposes of brevity.

The sole difference between the module isolation device 10 illustrated in FIG. 1 and the module isolation device 400 illustrated in FIG. 4 is that the preferred embodiment of the module isolation device 400 includes three additional elements; namely, a stationary, perforated plate 402 connected to the module isolation device for supporting a crushable member 404 thereon, the crushable member 404, preferably being a spring supported on the perforated plate 402, and a stopper, or actuating member 406 affixed to the valve stem 44D and movable with said valve stem. Optionally a porous insulation member 60D can be provided to insulate a downstream region of the isolation device 400, if desired.

As noted above, most preferably the crushable member 404 is a spring, which will not need to be replaced when the module isolation device 400 is repaired with a new rupture disk 48D, after a rupture disk has ruptured because of a malfunction of module 12D. Specifically, when the module isolation device 400 is shut down for repair, the compressed spring 404 will return to its normal, uncompressed state, and therefore does not need to be replaced. A preferred type of spring is a wave spring.

It should be noted that in this embodiment the lower surface 52D of the valve stem 44D is maintained out of engagement with the upper face 50D of the rupture disk 48D while the crushable member 404 acts against the actuating member 406 that is attached to the valve stem to normally maintain module isolation valve 40D in an opened condition.

In the embodiment of the invention illustrated in FIG. 4, the module isolation valve 40D includes valve seat 42D, valve stem 44D including a valve member 46D at one thereof, and a crushable member 404, e.g., a spring, retained on the stationary, perforate plate 402 and being compressible by an actuating member 406 attached to the valve stem.

Still referring to FIG. 4, in the event of a malfunction of the module 12D the pressure within the isolation device 400 will increase to an undesirable level, and the rupture disk 48D is engineered to rupture at that level. Subsequent to the rupturing of the disk 48D the increased flow acting upon the valve member 46D produces a pressure differential that forces the actuating member 406 against the spring 404 (or other crushable member), to thereby cause the valve member 46D to seat against the valve seat 42D while compressing the spring or other crushable member.

In the preferred embodiment, the lower end 52D of the valve stem 44D is maintained in a position where it does not move through the plane occupied by the rupture disk 48D.

As should be apparent, in the module isolation device 400 illustrated in FIG. 4 any vibration imposed upon the valve member 46D by the flow of oxygen during normal operation of the ITM oxygen module 12D will not cause the valve stem 44D to vibrate against the rupture disk 48D to thereby possibly cause a premature failure, or rupture, of that disk.

Turning to FIG. 5, a module isolation device 500 substantially similar to the module isolation device 100 depicted in FIG. 2 is shown. Components of the module isolation device 500 depicted in FIG. 5 that are identical to components of the module isolation device depicted in FIG. 2 are identified by the same numerals, but with the suffix "E." These latter components will not be described in detail herein, for purposes of brevity.

In fact, it should be apparent that the difference between the module isolation device 500 shown in FIG. 5 and the module isolation device 100 shown in FIG. 2 is that the module isolation valve assembly 40E in the FIG. 5 embodiment is modified to the preferred form 40D employed in the module isolation device 400 shown in FIG. 4. Accordingly, components of the module isolation valve 40E in the module isolation device 500 depicted in FIG. 5 that are identical to components of the module isolation valve, 40D in the module isolation device 400 depicted in FIG. 4 are identified by the same numerals, but with the suffix "E."

By way of brief explanation, in the event of a malfunction of the Ion Transport Membrane oxygen module 12E, resulting in an increased pressure within the module isolation device 500, the increased pressure acts directly on the first face 50E of the rupture disk 48E to cause the rupture disk to rupture. Thereafter, the increased flow of gas will act upon the valve member 46E to move said valve member in a downward direction to seat the valve member against valve seat 42E while compressing wave spring 404E. As is described in connection with the module isolation device 400 disclosed in FIG. 4, in accordance with the broadest aspect of this embodiment of the invention the wave spring 404E can be replaced with other types of crushable members, but most preferably the crushable member is in the form of a spring so that it will not need to be replaced when a module is repaired with a new rupture disk, after the original rupture disk fails due to a malfunction of the Ion Transport Membrane module 12E.

Turning to FIG. 6, module isolation devices 600 and 700 are depicted, which are similar to the module isolation devices 200 and 300 illustrated in FIG. 3, and provide exactly the same functions as these latter module isolation devices. Moreover, the only difference between the module isolation devices depicted in FIGS. 3 and 6 is in connection with the construction of the module isolation valves employed in the isolation devices. Components of module isolation devices 600 and 700 that are identical to components of module isolation devices 200 and 300 are designated by the same numerals, with the suffixes "F" and "G" respectively. Components of the module isolation valves in the module isolation devices 600 and 700 that are identical to the components of the module isolation valve in the module isolation device 400 illustrated in FIG. 4 are designated by the same numerals, also with the suffixes "F" and "G" respectively.

Suffice it to state, that the module isolation devices 600, 700 employed in connection with an ITM syngas module, as shown in FIG. 6, functions in the same manner as the module isolation devices 200 and 300 employed in the FIG. 3 embodiment, with the exception of the structure and operation of the isolation valves. In particular, in the module isolation devices 600 and 700 the module isolation valves 40F and 40G are each constructed in the same manner as the module isolation valve 40D employed in the module isolation device 400, and move between opened and closed positions in the same manner as in the module isolation device 400.

Thus, the module isolation valves 40F and 40G actually prevent their respective valve stems 44F, 44G from engaging the rupture disks 48F, 48G in the respective module isolation devices 600 and 700, to thereby prevent premature failure of those rupture disks resulting from vibration of the valve stems against the respective rupture disks caused by the normal flow of gas in the respective module isolation devices 600 and 700.

The potential problem of premature rupturing of rupture disks, which is solved by the structure of the module isolation valves 40F, 40G in the module isolation devices 600, 700, respectively, is prevalent in a module isolation device intended to function in the manner of module isolation device 700, wherein the flow of gas during normal operation of the ITM module is in a direction against the rupture disk 48G, which also is the direction tending to force or vibrate the valve stem against the rupture disk.

It should be understood that the flow of fresh air and spent air through module isolation devices 600 and 700 is the same as the flow of fresh air and spent air through the module isolation devices 300 and 400 in the FIG. 3 embodiment, with the module isolation valves 40G and 40H moving to a closed position after rupturing of rupture disks 48F and 48G, by the same mechanism that module isolation valve 40D is moved into a closed position in the module isolation device 400 disclosed in FIG. 4. Moreover, the low pressure headers 56F and 56G can be of the same construction and employed in the same manner as low pressure headers 56C and 56D in the module isolation devices 300 and 400, respectively.

Alternatively, the low pressure region communicating with the lower faces 54F, 54G of rupture disk 48F and 48G can be provided by communicating the fresh air feed plenum 202F with the lower surface of rupture disk 48F through a connecting conduit, and by communicating the spent air plenum 30G with the lower surface of rupture disk 48G through a connecting conduit, essentially in the same manner as described in connection with the module isolation device 100 illustrated in FIG. 2 and the modulation device 500 depicted in FIG. 5.

When the fresh air feed is employed to provide the low pressure area behind rupture disk 48F, and the spent air is employed to provide the low pressure area behind rupture disk 48G, there is no need to provide check valves in the low pressure sections to prevent contamination of the fresh air feed in the air feed header 202 or contamination of the spent gas in the spent gas collecting plenum 30G when rupture disks 48F and 48G, respectively, are ruptured. The reason why such check valves are not be required was explained earlier in connection with the isolation devices 200, 300; modified to provide air feed plenum 202 as the low pressure area behind rupture disk 48B and spent gas plenum 30C as the low pressure area behind rupture disk 48C. That explanation will not be repeated herein for purposes of brevity.

Although illustrated and described herein with reference to certain specific embodiments, the present invention is nevertheless not intended to be limited to the details shown. Rather, various modifications may be made in the details within the scope and range of equivalence of the claims and without departing from the spirit of the invention.

We claim:

1. A gas flow isolation device for isolating the flow of gas from one module into one or more other modules joined to said one module through one or more common headers, said gas flow isolation device including:

an inlet passage and an outlet passage including a flow restricting orifice through which gas passes to reduce the pressure of gas downstream of said orifice, said inlet passage being adapted to communicate with an outlet from said one module to receive a flow of gas from said one module, and said outlet passage communicating with said inlet passage for receiving said flow of gas and directing said gas out of said isolation device;

a module isolation valve movable from an opened condition to a closed condition to prevent the flow of gas from the inlet passage to the outlet passage when the pressure of the gas in the isolation device exceeds a predetermined level, said module isolation valve including:

a rupture disk having a first face and a second face, said first face being in flow communication with the outlet from said one module when the outlet of said one module is placed in flow communication with the inlet passage of the isolation device and the module isolation valve is in an opened condition permitting the flow of gas from the inlet passage to the outlet passage of said isolation device, said gas engaging and applying pressure to said first face of the rupture disk, said second face of the rupture disk being in flow communication with a chamber maintained at a desired low pressure by being in flow communication with the flow of gas downstream of said flow restriction oriface, said rupture disk rupturing when a predetermined pressure differential occurs across said rupture disk;

a valve seat between said inlet passage and said outlet passage;

a valve stem having opposed first and second ends, said first end being mechanically linked with the first face of said rupture disk and the second end being coupled to a valve member, said valve member being spaced from the valve seat when the first end of the valve stem is mechanically linked with the rupture disk to permit the flow of gas from the inlet passage to the outlet passage and also to permit the flow of gas into engagement with the first face of the rupture disk when the inlet passage is placed in flow communication with the outlet from said one module;

whereby said rupture disk will rupture upon a predetermined pressure differential occurring across the rupture disk to cause the valve member to seat against the valve seat and terminate the flow of gas from the inlet passage to the outlet passage and also through the rupture disk.

2. The gas flow isolation device of claim 1, wherein said chamber maintained at a desired low pressure is part of a common low pressure header when two or more modules are joined together, said valve system, when in a closed condition after the rupture disk ruptures, preventing the flow of gas past the ruptured disk into said chamber.

3. The gas flow isolation device of claim 1, wherein said low pressure gas is gas that has passed through said flow restricting device in said outlet passage.

4. The gas flow isolation device of claim 1, including a seal adapted to be connected to an ion transport membrane module to permit the flow of gas from said ion transport membrane module into the inlet passage of said flow isolation device.

5. The gas flow isolation device of claim 1, including a seal adapted to be connected to an ion transport membrane module of the type employed for separating oxygen from an oxygen-containing gas and directing the oxygen into the inlet passage of the gas flow isolation device.

6. The gas flow isolation device of claim 1, including a seal adapted to be connected to an ion transport membrane module of the type employed for producing synthesis gas, said gas flow isolation device being a spent gas isolation device and the inlet passage of said spent gas isolation device being in communication with spent gas exiting said module.

7. The gas flow isolation device of claim 6 in combination with a second fresh gas isolation device having an inlet passage for receiving an oxygen-containing gas, an outlet passage for said oxygen-containing gas downstream of said inlet passage, said outlet passage of said fresh gas isolation device being adapted to communicate with an oxygen-containing gas inlet of the ion transport membrane module to permit the oxygen-containing gas to be directed into and through the module to provide oxygen ions for the production of synthesis gas; a module isolation valve in said fresh gas isolation device being movable from an opened condition to a closed condition to prevent a back-flow of synthesis gas from the ion transport membrane module into the inlet passage of said fresh gas isolation device when a back-pressure created by said back-flow exceeds a predetermined level, said module isolation valve in said fresh gas isolation device including:

a rupture disk having a first face and a second face, said first face being in flow communication with the oxygen-containing gas inlet of the ion transport membrane and the outlet passage of the fresh gas isolation device when said module isolation valve of said second isolation device is in an opened condition, whereby back-pressure resulting from any back-flow of synthesis gas from the ion transport membrane module is directly imposed on said first face of the rupture disk, said second face of the rupture disk being in flow communication with a chamber maintained at a desired low pressure, said rupture disk rupturing when the back-pressure exceeds a predetermined pressure level;

a valve seat between said inlet passage and said outlet passage of said second isolation device and, in the direction of oxygen-containing gas flow during normal operation, said valve seat being downstream of said rupture disk and upstream of said oxygen-containing gas inlet of said ion transport membrane module;

a valve stem having opposed first and second ends, said first end being mechanically linked with the first face of said rupture disk of said second isolation device and the second end being coupled to a valve member, said valve member being spaced from the valve seat when the first end of the valve stem is mechanically linked with the rupture disk to permit the flow of oxygen-containing gas from the inlet passage of said second isolation device into the oxygen-containing gas inlet of said ion transport membrane module and to directly impose any back-pressure resulting from any backflow of synthesis gas from the ion transport membrane module onto the first face of the rupture disk of said second isolation;

whereby said rupture disk of said second isolation device will rupture when the back-pressure exceeds a predetermined pressure level to cause the valve member to seat against the valve seat in the second isolation device and close the module isolation valve in said second isolation device, thereby preventing the back-flow of synthesis gas from the ion transport membrane module into the inlet passage of the second module isolation device and into said chamber maintained at a desired low pressure and communicating with said second isolation device through said ruptured disk.

8. The combination of claim 7, wherein said first end of the valve stem in said second isolation device is mechanically linked with the first face of said rupture disk of said second housing by engaging said first face.

9. The combination of claim 7, including a flow restricting orifice through which the oxygen-containing gas passes prior to entering the second isolation device from the inlet passage thereof, said inlet passage of said second isolation device communicating with an oxygen-containing gas plenum upstream of said flow restricting orifice.

10. The combination of claim 9, wherein said chamber communicating with the rupture disk of said second isolation device and being maintained at a desired low pressure is maintained at said desired low pressure by being in flow communication with gas from said oxygen-containing gas plenum.

11. The combination of claim 10, wherein said chamber communicating with the rupture disk of the spent gas isolation device and being maintained at a desired low pressure is maintained at said desired low pressure by being in flow communication with spent gas passing through the outlet passage of said spent gas isolation device.

12. The combination of claim 9, wherein said chamber communicating with the rupture disk of said fresh gas isolation device and being maintained at a desired low pressure is maintained at said desired low pressure by being in flow communication with a low pressure gas independent of said oxygen-containing gas flow.

13. The combination of claim 7, wherein said chamber communicating with the rupture disk of said fresh gas isolation device and being maintained at a desired low pressure is part of a common header when two or more modules are joined together, said module isolation valve of said fresh gas isolation device, when in a closed condition after rupturing of the rupture disk, preventing the flow of gas past the ruptured disk into said chamber communicating with the ruptured disk of said fresh gas isolation device.

\* \* \* \* \*